July 12, 1960     J. G. KNOWLES     2,944,637
HYDRAULIC BRAKE SYSTEMS
Filed Sept. 16, 1957     3 Sheets-Sheet 1
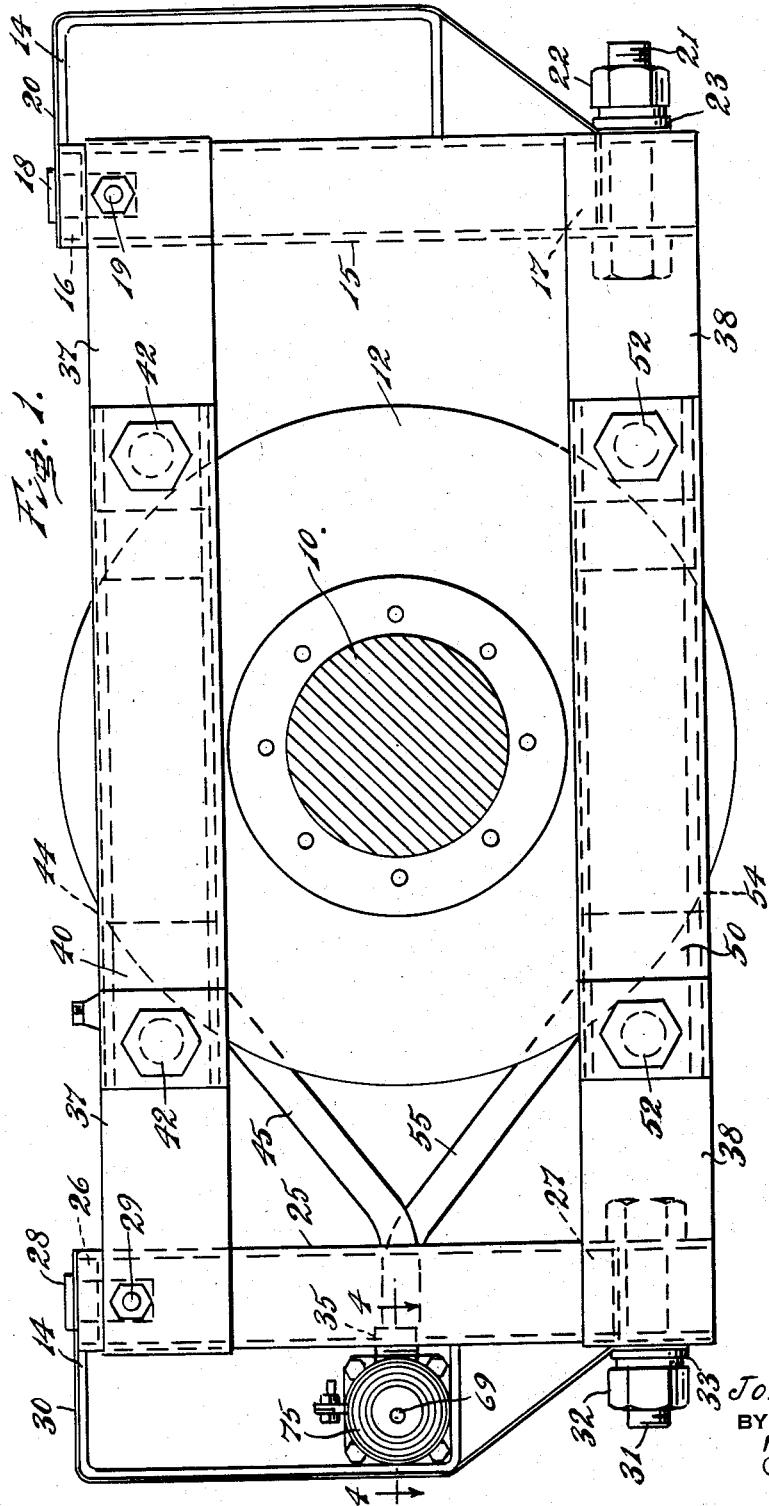
INVENTOR
*John G. Knowles*
BY
ATTORNEY.

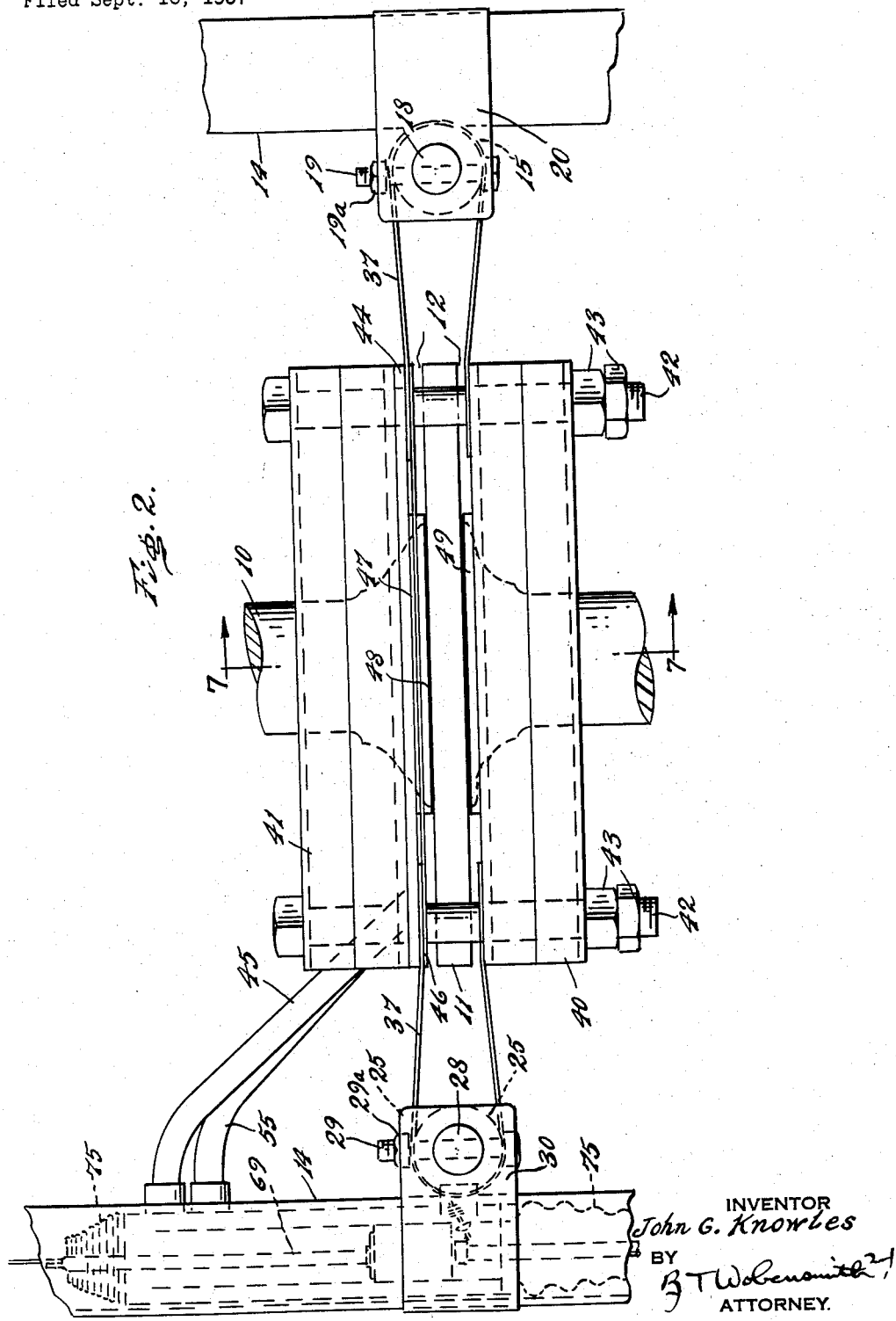

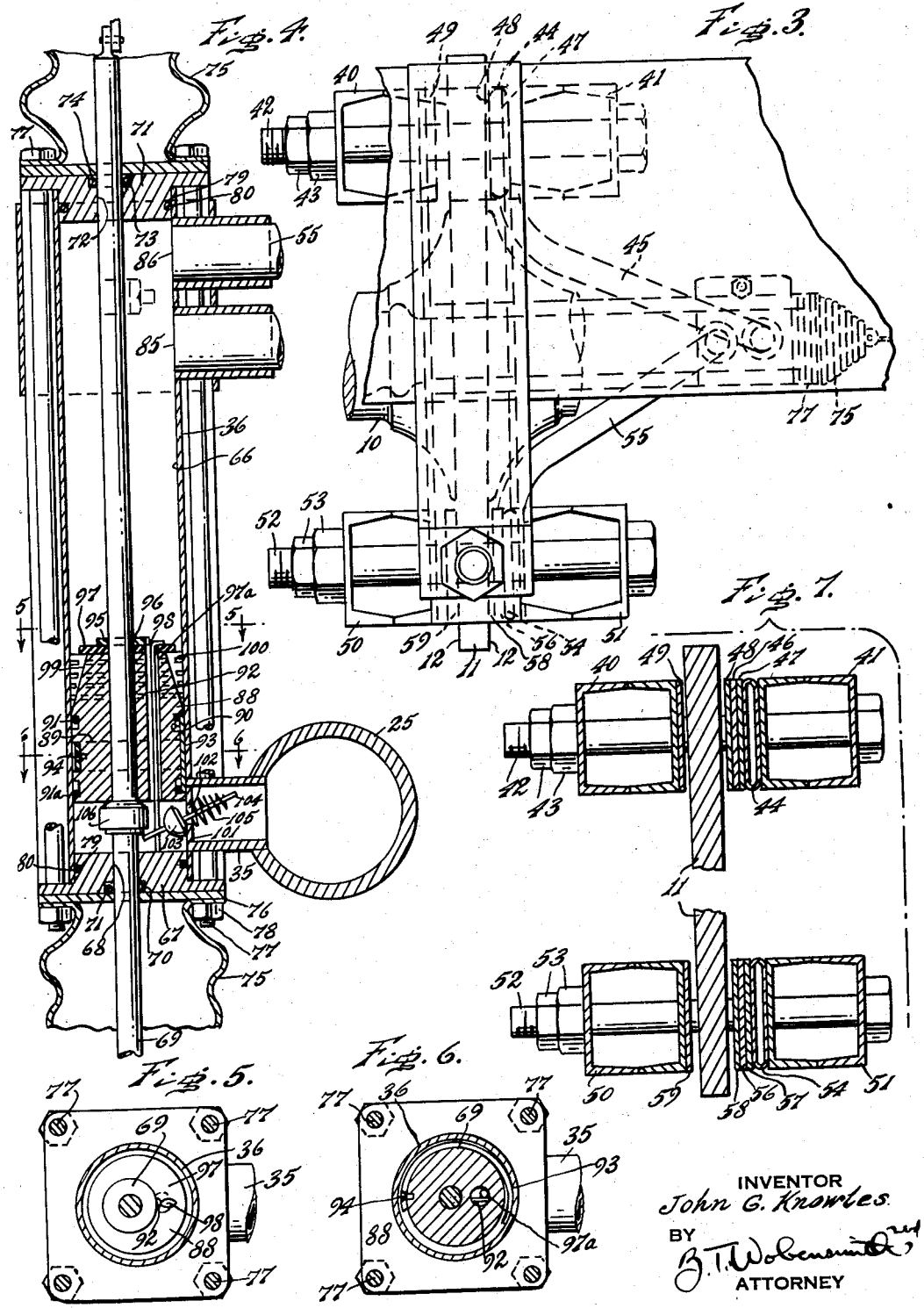

United States Patent Office 2,944,637
Patented July 12, 1960

2,944,637

HYDRAULIC BRAKE SYSTEMS

John G. Knowles, 992 Huntingdon Pike, Huntingdon Valley, Pa.

Filed Sept. 16, 1957, Ser. No. 684,166

6 Claims. (Cl. 188—73)

This invention relates to hydraulic brake systems, and more particularly to a hydraulic brake system suitable for, but not limited to, use as an emergency brake on motor vehicles and the like.

In accordance with the present invention a brake system is provided which is relatively simple in construction and inexpensive to manufacture.

In accordance with the present invention, also, a brake system is provided for the controlled application of a braking force and in which partial or complete braking can be effected as desired.

In accordance with the present invention, also, a hydraulic brake system is provided in which the component parts are assembled in a manner so as to be readily accessible for inspection, maintenance and repair.

In accordance with the present invention, also, a hydraulic brake system is provided having improved structure for the application of a braking force.

In accordance with the present invention, also, a hydraulic brake system is provided embodying a control valve mechanism of improved character.

Other objects and advantageous features of the invention will be apparent from the description and claims.

The nature and characteristic features of the invention will be more readily understood from the following description, taken in connection with the accompanying drawings forming part thereof, in which:

Figure 1 is a front elevational view of a brake system in accordance with the invention;

Fig. 2 is a top plan view of the brake system shown in Fig. 1;

Fig. 3 is a side elevational view of the hydraulic brake system shown in Fig. 1;

Fig. 4 is an enlarged horizontal sectional view taken approximately on the line 4—4 of Fig. 1, and showing the control valve housing and the valve therein;

Fig. 5 is a sectional view taken approximately on the line 5—5 of Fig. 4;

Fig. 6 is a transverse sectional view taken approximately on the line 6—6 of Fig. 4; and Fig. 7 is a fragmentary sectional view taken approximately on the line 7—7 of Fig. 2.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, the shaft 10 to which the braking force is to be applied has a disc 11 carried thereby and bounded by two opposed outer faces 12 disposed in non-parallel relation to each other.

The shaft 10 is shown as mounted between spaced parallel and horizontally disposed supporting frame bars 14, which can be part of the frame of the vehicle, or any other desired frame construction. The frame bars 14 are preferably of C-shape.

One of the frame bars 14 has a vertically disposed hollow mounting block 15 secured thereto in any desired manner. The mounting block 15 has an upper head portion 16 and a lower head portion 17 secured therein. A headed fastener 18 is provided extending downwardly through the head portion 16 and a horizontally extending bolt 19 is provided for holding the fastener 18 in position. The bolt 19 has a nut 19a thereon.

The fastener 18 preferably serves as the upper mounting for a strap 20 for securing the block 15 in position with respect to the contiguous frame bar 14. The lower end of the strap 20 is carried on a bolt 21 extending through the block 15 below the head portion 17 and is held by a nut 22 and lock washer 23.

The other frame bar 14 is also provided with a vertically disposed hollow mounting block 25 secured thereto in any desired manner. The mounting block 25 has an upper head portion 26 and a lower head portion 27 secured therein in fluid tight relation. A headed fastener 28 is provided extending downwardly through the head portion 26 and a horizontally extending bolt 29 is provided for holding the fastener 28 in position. The bolt 29 has a nut 29a thereon.

The fastener 28 preferably serves as the upper mounting for a strap 30 for securing the block 25 in position with respect to the contiguous frame bar 14. The lower end of the strap 30 is carried on a bolt 31 extending through the block 25 below the head portion 27 and is held by a nut 32 and lock washer 33.

The mounting block 25 preferably serves as a fluid reservoir and has a pipe 35 welded thereto which is in communication with a horizontally disposed valve housing 36 mounted in the contiguous frame bar 14.

At the upper part of each of the mounting blocks 15 and 25, an upper resilient strap or band 37 of U-shape is provided and is secured in position by the bolts 19 and 29 and at the lower part of each of the mounting blocks 15 and 25, a lower resilient strap or band 38 of U-shape is provided and is secured in position with respect to the mounting blocks 15 and 25 by the bolts 21 and 31 and nuts 22 and 32.

The upper straps or bands 37 have opposite upper hollow frame sections 40 and 41, consisting if desired, of facing channels mounted thereon in spaced relation by bolts 42 extending through the bands 37 and the frame sections 40 and 41. The spacing of the frame sections 40 and 41 can be adjusted, for purposes to be explained, by adjustment of lock nuts 43 on the bolts 42.

One of the upper frame sections, such as the frame section 41, has extending therealong and carried by the bolts 42, an expansible portion, preferably including a tubular section 44 of flattened elliptical cross section closed at its free end, and from the opposite end of which a fluid connection 45 extends.

The bolts 42 also have a flexible plate 46 mounted thereon and supported thereby. The plate 46 on the face thereof towards the tubular section 44 is provided with a strip of heat insulating material 47 and on the face thereof away from the tubular section 46 a strip 48 of friction lining material of the type commonly employed for brake linings and the like is secured.

The other of the upper frame sections, such as the frame section 40, in spaced relation to the strip 48 is provided with a similar strip 49 of friction lining material secured thereto.

The lower straps or bands 38 have opposite upper hollow frame sections 50 and 51, consisting if desired, of facing channels mounted thereon in spaced relation by bolts 52 extending through the bands 38 and the frame sections 50 and 51. The spacing of the frame sections 50 and 51 can be adjusted, for purposes to be explained, by adjustment of lock nuts 53 on the bolts 52.

One of the lower frame sections, such as the frame section 51, has extending therealong and carried by the bolts 52, an expansible portion, preferably including a tubular section 54 of flattened elliptical cross section closed at its free end, and from the opposite end of which a fluid connection 55 extends.

The bolts 52 also have a flexible plate 56 mounted thereon and supported thereby. The plate 56 on the face thereof towards the tubular section 54 is provided with a strip of heat insulating material 57 and on the face thereof away from the tubular section 56 a strip 58 of friction lining material of the type commonly employed for brake linings and the like is secured.

The other of the lower frame sections, such as the frame section 50, in spaced relation to the strip 58 is provided with a similar strip 59 of friction lining material secured thereto.

It will be noted that the disc 11 is disposed in such manner that the upper frame sections 40 and 41 are on opposite sides thereof above the shaft 10 and the lower frame sections 50 and 51 are on opposite sides thereof below the shaft 10. The facing portions of the strips 48 and 49 and of the strips 58 and 59 are in positions for engagement by and with the faces 12 of the disc 11 in a manner to be explained.

The valve housing 36, shown in more detail in Figs. 4, 5, and 6, preferbaly has an elongated tubular body portion 65 in communication at one end thereof and through the pipe 35 with the liquid reservoir in the mounting block 25.

The valve housing 36 has a central longitudinally extending bore 66 providing a valve chamber, with a head 67 at one end thereof having an opening 68 for the reception of a valve operating rod 69.

The opening 68 can be provided with a groove 70 therein for the reception of a sealing ring 71, such as an O-ring, which, by its engagement with the groove 70 and with the valve rod 69 prevents fluid leakage at this location.

The bore 66 is closed at its other end by a head 71. The head 71 has an opening 72 therethrough aligned with the opening 68 for the passage of the valve rod 69. The head 71 can be provided with a groove 73 for the reception of a packing ring 74, such as an O-ring, for preventing fluid leakage between the valve rod 69 and the head 71.

Dust boots 75 of flexible material can be provided at each of the heads 67 and 71 held in place by plates 76 and longitudinal stiffening bolts 77 with end nuts 78.

The heads 67 and 71 can each be provided with a groove 79 for the reception of a sealing ring 80, such as an O-ring, for preventing fluid leakage between the heads 67 and 71 and the valve housing 36.

The bore 66 in predetermined spaced relation to the pipe 35 is provided with spaced ports 85 and 86 which are in communication respectively with the fluid connections 45 and 55, and thus in communication with the interiors of the expansible tubular sections 44 and 54.

A valve plug 88 is provided, shown in detail in Figs. 4, 5 and 6, which is secured to the valve rod 69 in any desired manner for movement thereby, and at a predetermined location for cooperation with the ports 85 and 86. The valve plug 88 is provided at spaced locations thereon and on either side of a groove 89 with spaced peripheral grooves 90 for the reception of packing rings 91 and 91a, such as O-rings.

The valve plug 88, in parallel relation to the opening through which the valve rod 69 extends, is provided with a passageway 92.

The valve plug 88 has mounted thereon at the groove 89 a port shield plate 93 of spring steel or the like held in position at one end by a stud 94 and with a portion extending over the sealing rings 91 and 91a for preventing their outward movement into the port 85 upon movement thereover of the valve plug 88.

Mounted on the valve rod 69, and held in position against longitudinal movement by a washer 95 and snap ring 96, a valve disc 97 of resilient material is provided. The valve disc 97 has a port 98 for permitting a liimted flow of fluid into the passageway upon movement of the valve plug 88 towards the ports 85 and 86, and is capable of a limited flapping movement to permit of increased flow upon movement of the valve plug 88 in the opposite direction. The valve plug 88 does not fit tightly in the bore 66 but has a diametrical clearance with respect thereto of the order of 0.006 inch. The valve disc 97 can have an actuating rod 97a secured thereto and extending through the passageway 92 and adatped upon engagement with the head 67 to open the valve disc 97.

The valve plug 88 is provided with a plurality of V-shaped diverging grooves 99 extending from just beyond the packing ring 91 and terminating at an end face of the valve plug 88 and from which a plurality of peripheral grooves 100 extend to provide leakage or bleed passageways.

At the portion of the pipe 35 terminating at the valve housing 36, a wall portion 101 is provided with a port 102 therethrough for establishing communication under certain conditions between the reservoir 25 and the bore 66, and with respect to which communication is cut off in certain positions of the valve plug 88, as hereinafter explained.

A valve is provided at the port 102 which includes a plug 103 mounted on a valve stem 104 which extends through the port 102 and is supported by a resilient mounting 105, such as a conical spring which normally urges the valve plug 103 to closed position with respect to the port 102 but which permits of the valve plug 88 being moved to open position upon engagement of a collar 106 secured to the valve rod 69 with the valve stem 104.

The mode of operation will now be pointed out.

The tubular sections 44 and 54, the fluid connections 45 and 55 and the bore 66 between the valve plug 88 and the head 71 are filled with liquid and a supply of liquid is also in the reservoir 25. In the released position, the valve plug 88 will be positioned in the bore 66 as seen in Fig. 4 and the shaft 10 will rotate freely.

If it is desired to partially apply the brakes, the valve rod 69 is moved to position the valve plug 88 closer to but not in covering position with respect to the port 85. The movement of the valve plug 88 in this manner tends to increase the pressure of the liquid in the bore 66 and the extent of movement of the valve plug 88 will determine the pressure of the liquid applied through the ports 85 and 86 and through the fluid connections 45 and 55 to the interior of the tubular sections 44 and 54. As the pressure is applied in the tubular sections 44 and 54, and dependent upon the spacing of the upper frictional gripping elements 48 and 49 and the lower frictional gripping elements 58 and 59 by the adjustment of the upper frame sections 40 and 41 and the lower frame sections 50 and 51, a partial application of the brakes can be effected. As the pressure is increased in the tubular sections 44 and 54 they are expanded from their flattened elliptical shape towards a more circular cross section and the force exerted thereby is effective for moving the bands 48 and 58 to bring the upper lining strips 48 and 49 and the lower lining strips 58 and 59 into engagement with the non-parallel faces 12 of the disc 11. A dragging or braking effect of limited extent can thus be accomplished.

It will be noted that there is a tendency, because of the non-parallel relation of the faces 12, to initiate a pumping action from one of the tubular sections, such as the tubular section 44, to the other tubular section, such as the tubular section 54, through the fluid connection 45, the ports 85 and 86 and the fluid connection 55, but free from any obstruction in the bore 66.

For a further increased braking effect the valve plug 88 is moved closer to the head 71 so that the port 85 is partially or wholly covered, dependent upon the positioning of the valve plug 88. A controlled restrictive action is thus set up between the tubular sections 44 and 54 and a greater braking effect is available than before.

If now the valve plug 88 is moved still closer to the head 71 a limited bleed or leakage but less than that available with the plug 88 in only partial closing relation to the port 85 is permitted through the grooves 99 and 100 for a still further increased braking effect.

If now the valve plug 88 is moved still closer to the head 71, so as to cut off communication between the ports 85 and 86, no fluid can be pumped from one of the tubular sections 44 or 54 to the other and a maximum braking effect or locking of the upper lining strips 48 and 49 and the lower lining strips 58 and 59 with respect to the disc 11 is effected.

It will be noted that the upper straps or bands 37 and the lower straps or bands 38 provide a resilient equalizing mounting of the upper lining strips 48 and 49 and the lower lining strips 58 and 59 for applying the desired frictional engaging action.

During movement of the valve plug 88 towards the head 71 a limited flow from the reservoir 25 to the bore 66 is permitted, the valve plug 103 opening the port 102 to permit fluid to enter the bore 66 between the valve plug 88 and the head 67.

Upon return movement of the valve plug 88 towards the head 67 restricted communication between the tubular sections 44 and 54 will be established, then less restricted, and finally free communication between the ports 85 and 86 will be established as a reverse of that previously described for movement of the valve plug 88 towards the head 71.

Upon movement of the valve plug 88 towards the head 67 the valve disc 97 will tend to move from its covering relation with respect to the end of the passageway 92 thereby to permit the more rapid return of the valve plug 88.

As the valve plug 88 moves towards the head 67, also, the collar 106 will strike the valve stem 104 and move the valve plug 103 to a position to uncover the port 102 and permit the return of fluid to the reservoir 25. It will be noted that the port shield plate 93 is positioned so as to protect the sealing rings 91 and 91a upon movement of the valve plug 88 over the port 85.

The port 98 in the valve disc 97 permits of a limited flow from one side to the other of the valve plug 88 and provides a cushioning action upon movement of the valve plug 88 towards the head 71 so as to provide a smooth application of the braking effect.

I claim:

1. A hydraulic brake system for a shaft comprising a brake disc carried by said shaft and having opposed face portions in non-parallel relation to each other longitudinally axially of said shaft, a fixedly mounted frame, spaced frame members in parallel pairs and in chordal relation with respect to said disc faces, mounting members connecting said frame and said frame members, a plurality of fluid operated expansible members carried by said frame members on opposite sides of the axis of the shaft, members interposed between said expansible members and said face portions for braking engagement with said face portions, a valve housing having spaced ports connected respectively to the interiors of said expansible members, a valve member in said valve housing, and an actuating member for said valve member, said valve member being movable with respect to said ports to permit free flow between said ports, restrict the flow between said ports and cut off the flow between said ports.

2. A hydraulic brake system as defined in claim 1 in which said expansible members are tubes elliptical in transverse cross section.

3. A hydraulic brake system as defined in claim 1 in which said expansible members are tubes elliptical in transverse cross section and have closed ends.

4. A hydraulic brake system for a shaft comprising a brake disc carried by said shaft and having opposed face portions in non-parallel relation to each other longitudinally axially of said shaft, a fixedly mounted frame, spaced frame members in parallel pairs, and in chordal relation with respect to said disc faces, resilient mounting members interposed between said frame and said frame members, fluid operated expansible members carried by a frame member of each pair, friction strips interposed between said expansible members and said disc faces and the other frame member of each pair and said disc faces, a valve housing having spaced ports connected respectively to the interiors of said expansible members, a valve member in said valve housing, and an actuating member for said valve member, said valve member being movable with respect to said ports to permit free flow between said ports, restrict the flow between said ports and cut off the flow between said ports.

5. A hydraulic brake system for a shaft comprising a brake disc carried by said shaft and having opposed face portions in varying spaced relation to each other longitudinally axially of said shaft, a fixedly mounted frame, a plurality of fluid operated expansible members carried by said frame on opposite sides of the axis of the shaft, members interposed between said expansible members and said face portions for braking engagement with said face portions, a valve housing having spaced ports connected respectively to the interiors of said expansible members, a valve member in said valve housing, an actuating member for said valve member, said valve member being movable with respect to said ports to permit free flow between said ports, restrict the flow between said ports and cut off the flow between said ports, and mounting members including resilient supports for said expansible members interposed between said fluid expansible members and said frame.

6. A hydraulic brake system for a shaft comprising a brake disc carried by said shaft and having opposed face portions in varying spaced relation to each other longitudinally axially of said shaft, a fixedly mounted frame, a plurality of fluid operated expansible members carried by said frame on opposite sides of the axis of the shaft, members interposed between said expansible members and said face portions for braking engagement with said face portions, a valve housing having spaced ports connected respectively to the interiors of said expansible members, a valve member in said valve housing, an actuating member for said valve member, said valve member being movable with respect to said ports to permit free flow between said ports, restrict the flow between said ports and cut off the flow between said ports, and mounting members between said fluid expansible members and said frame, said mounting members including resilient supports for said expansible members, said resilient supports having adjustable frame portions with friction facings for braking engagement with said faces.

References Cited in the file of this patent

UNITED STATES PATENTS

| | | |
|---|---|---|
| 2,270,586 | Jahant et al. | Jan. 20, 1942 |
| 2,487,117 | Eaton | Nov. 8, 1949 |
| 2,784,811 | Butler | Mar. 12, 1957 |
| 2,788,094 | Knowles | Apr. 9, 1957 |
| 2,815,098 | Olving | Dec. 3, 1957 |